United States Patent [19]

Müller

[11] 3,933,647
[45] Jan. 20, 1976

[54] APPARATUS FOR THE SEPARATION OF LIQUID MIXTURES BY MEANS OF PERMEABILITY SELECTIVE SEPARATION MEMBRANES

[75] Inventor: Fritz Müller, Avully, Switzerland

[73] Assignee: Louis Schleiffer AG, Feldbach, Switzerland

[22] Filed: June 17, 1974

[21] Appl. No.: 480,192

[30] Foreign Application Priority Data
June 19, 1973 Switzerland................... 8849/73

[52] U.S. Cl.................................. 210/346; 210/433
[51] Int. Cl.$^2$.......................................... B01D 31/00
[58] Field of Search........... 210/321, 347, 346, 433, 210/23

[56] References Cited
UNITED STATES PATENTS

| | | | |
|---|---|---|---|
| 3,348,833 | 8/1968 | Marks et al..................... | 210/347 X |
| 3,398,834 | 8/1968 | Huttall et al.................... | 210/346 X |
| 3,400,825 | 9/1968 | Shippey............................ | 210/321 |
| 3,456,805 | 7/1969 | Jarvis et al....................... | 210/321 |
| 3,556,302 | 1/1971 | Agranat........................... | 210/433 X |
| 3,560,377 | 2/1971 | Loeffler.......................... | 210/DIG. 23 |
| 3,623,610 | 11/1971 | Olsen et al...................... | 210/346 X |

*Primary Examiner*—Frank A. Spear, Jr.
*Attorney, Agent, or Firm*—Ladas, Parry, Von Gehr, Goldsmith & Deschamps

[57] ABSTRACT

An apparatus for the separation of liquid mixtures by means of permselective separation membranes, comprising at least one separation module composed of a distributor plate, a collector plate and an intermediate situated separation membrane. The distributor plate is provided at the region of the effective membrane surface with at least one throughpassage opening arranged at the periphery thereof for the mixture to be separated and at least one open flow channel extending from said throughpassage opening towards the center of the membrane. The flow channel is arranged such that the mixture along one face of the membrane is subjected to a turbulent flow for the successive flushing of the membrane surface. The membrane is provided with an axial throughflow opening into which opens the flow channel. The collector plate is provided with an axial bore, a substantially ring-shaped recess arranged opposite the flow channel, a highly porous carrier element arranged in the ring-shaped recess for substantially uniformly supporting the membrane at a discharge side thereof, and at least one collecting channel leading from the periphery of the ring-shaped recess towards the outside. The carrier element is pressure resistant and highly porous to an extent sufficient to allow for a rapid unhindered flow-off of the permeate which flows through and out of the membrane via the ring-shaped recess to the collecting channel without any appreciable pressure drop and at the same time opposing any bending-through of the membrane. There are also provided sealing means provided at the distributor plate and the collector plate for sealing the flow channel and the ring-shaped recess at the center and at the periphery of the membrane from one another and from the surroundings against high pressure and vacuum.

12 Claims, 3 Drawing Figures

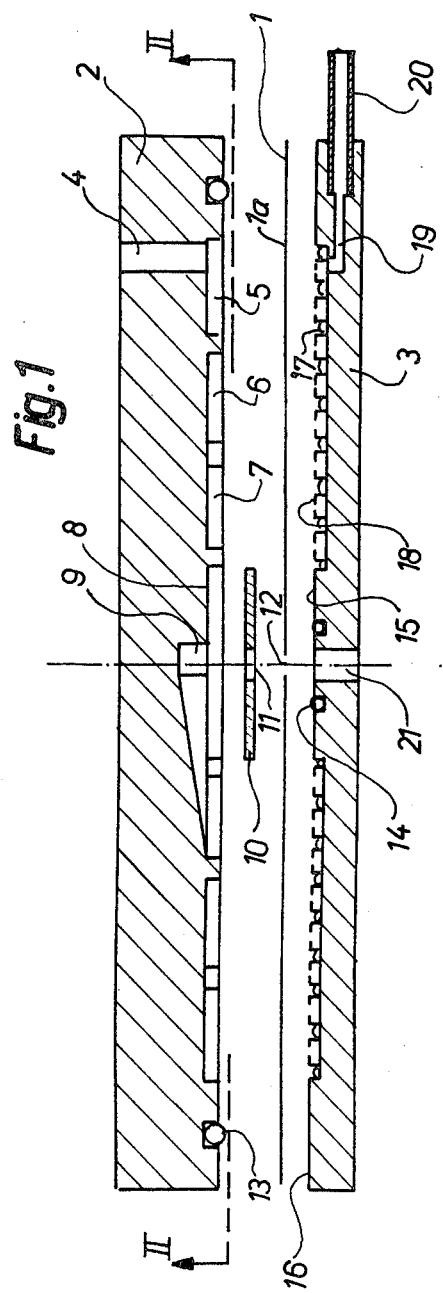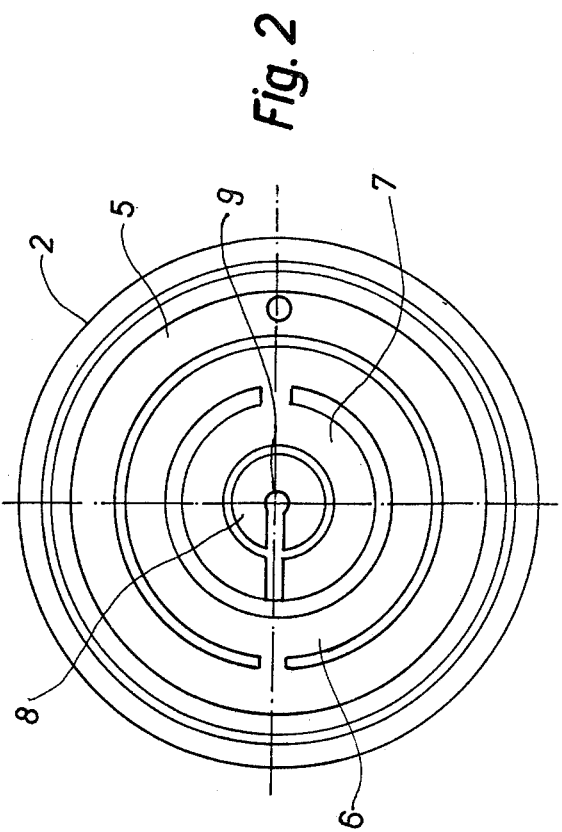

APPARATUS FOR THE SEPARATION OF LIQUID MIXTURES BY MEANS OF PERMEABILITY SELECTIVE SEPARATION MEMBRANES

BACKGROUND OF THE INVENTION

The present invention relates to apparatus for the separation of liquid mixtures, especially organic substance mixtures and aqueous salt solutions.

Organic mixtures which are in a liquid state at room temperature, especially those which are relatively difficult to separate, advantageously are separated by techniques known as perstraction and pervaporation, in both cases a high degree of separation being realized through the use of permselective (permeability selective) membranes or diaphragms. With perstraction, also referred to as membrane-delayed extraction, the liquid mixture is delivered at high pressure (up to about 1000 atmospheres) to the front face of a microporous, permselective membrane and the permeating material, i.e. the fraction to be separated out in a suitable extraction liquid, is withdrawn at low pressure (for instance 1 atmosphere) from the membrane rear face.

On the other hand, in the case of pervaporation dense or non-porous permselective membranes are used, to the front face of which there is delivered the liquid mixture at atmospheric pressure or low excess pressure and at the rear face of which there is withdrawn the permeating material under vacuum in a vapor state.

The multifarious separation work which is to be carried out at the present time, however, results in very different requirements which are dependent upon numerous parameters with respect to the substance and the operating conditions and are especially difficult to determine by calculations. Therefore for each case special equipment must be constructed, requiring for this purpose a high experimental expenditure before it is possible to devise a separation apparatus which really allows for satisfactory separation operations on a technical scale.

SUMMARY OF THE INVENTION

Hence, the present invention aims at the provision of a new and improved construction of apparatus for the separation of liquid mixtures by means of permselective separation membranes or diaphragms in a manner not associated with the aforementioned drawbacks and limitations of the prior art constructions.

Another object of the invention is directed to overcoming the aforementioned difficulties prevailing in this field of technology.

Yet a further and more specific object of the invention aims at the provision of a versatile separation apparatus enabling the performance of technologically satisfactory separation operations for different separation purposes through the use of easily exchangeable membranes accommodated to the momentarily encountered purpose and wherein the separation operation can be carried out under very different operating conditions, such as pressure, throughput and the like.

Now in order to implement these and still further objects of the invention, which will become more readily apparent as the description proceeds, the subject matter of this development relates to an improved construction of apparatus for the separation of liquid mixtures by means of permselective separation membranes, and which apparatus is manifested by the features that it comprises at least one separation module incorporating a distributor plate, a collector plate and an intermediately situated separation membrane, wherein such is supported at both sides and sealed towards the outside. The distributor plate at the region of the effective membrane surface has at least one throughflow opening arranged at the periphery thereof for the mixture to be separated-out as well as one open flow channel extending along a curved line from this opening to the center of the membrane. The flow channel is arranged such that the mixture is exposed along one side of the membrane to a turbulent flow for the successive flushing of the membrane surface along a serpentine-shaped or undulated path from the periphery to the center thereof. The membrane possesses an axial throughflow opening into which opens the flow channel. The collector plate has an axial bore, a substantially ring-shaped recess opposite the flow channel, and a highly porous carrier element arranged in the ring-shaped recess for uniformly supporting the membrane at its exit or discharge side as well as at least one collecting channel leading from the periphery of the ring-shaped recess towards the outside. The carrier element is constructed to be pressure resistant and highly porous in such a way that it can permit a rapid unhindered flowing-off of the material which flows through and out of the membrane via the recess to the collecting channel without any considerable pressure drop and at the same time opposing any bending-through of the membrane. Sealing means are provided at the distributor plate and the collector plate such that the flow channel and the ring-shaped recess are sealed at the center and at the periphery of the membrane against high pressure or vacuum effects from one another and from the surroundings.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a cross-sectional view of a first exemplary embodiment of the invention in the form of a simple separation module with a single separation membrane or diaphragm, the module components having been illustrated in spaced relationship from one another to improve clarity in illustration;

FIG. 2 is a plan view of the distributor plate of the separation module shown in FIG. 1, viewed along the line II—II thereof.

DETAILED DESCRIPTION OF THE PREFERRED EMBODIMENTS

Figure 3:
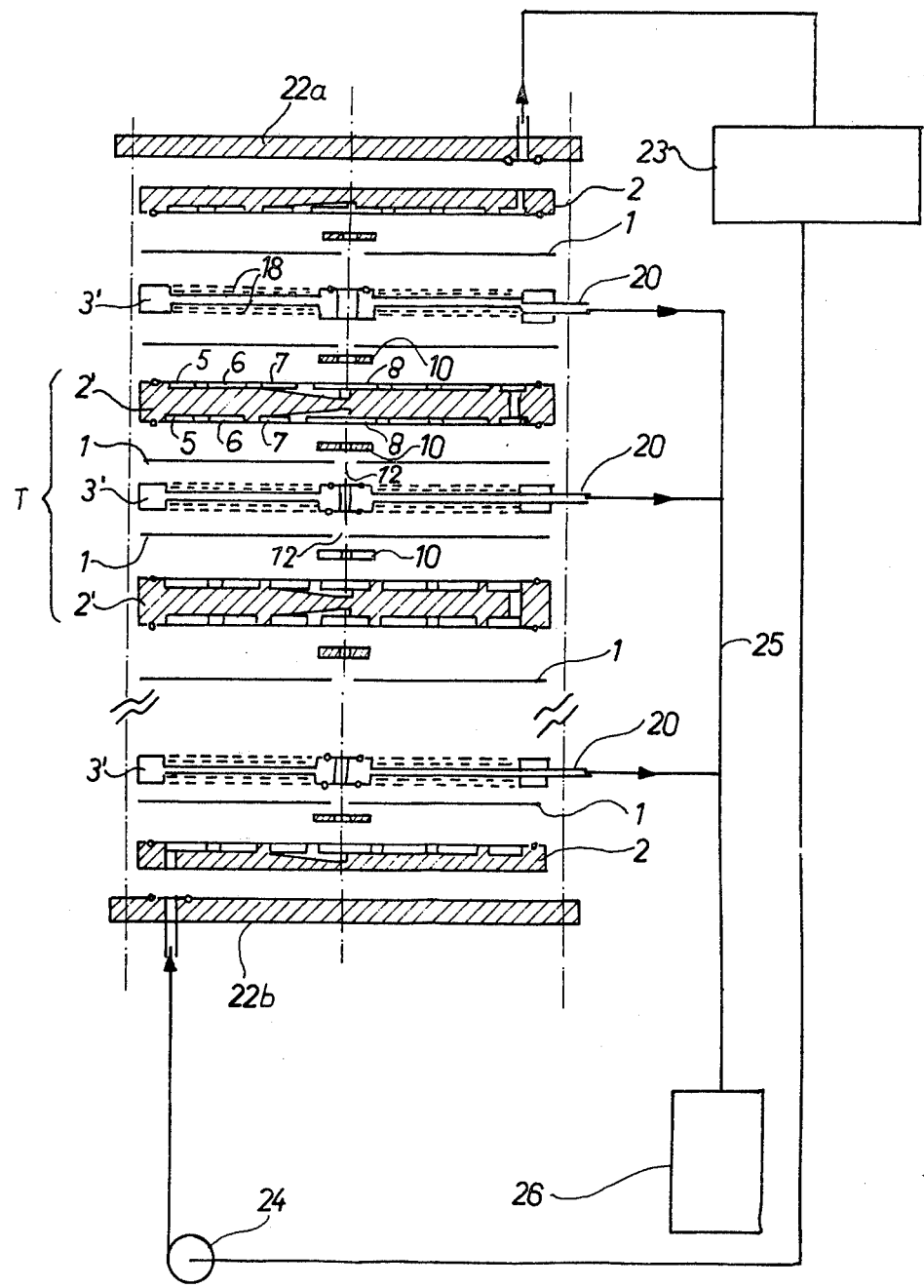
FIG. 3 is a cross-sectional view of a second exemplary embodiment incorporating a number of separation modules.

Describing now the drawings, the simple separation module depicted in FIG. 1 consists essentially of a single permselective separation membrane 1 which is sealingly mounted by means of not particularly illustrated holding means between a distributor plate 2 and a collector plate 3.

As best seen by referring to FIGS. 1 and 2 the distributor plate 2 is provided at the region of its periphery with an inlet bore or throughflow opening 4 which allows for the inflow of the liquid mixture to be separated to the top side or surface 1a of the membrane 1.

The distributor plate 2 is provided at its underface with coaxial substantially ring-shaped grooves 5, 6 and 7 defining a flow channel and these grooves are connected with one another and with a central circular-shaped depression or recess 8 equipped with an outlet opening 9. In the recess 8 there is inserted a contact ring 10 having an axial outlet bore 11. The membrane 1 is also equipped with an axial throughflow opening 12 and with the aid of the sealing O-rings 13 and 14 is held at its periphery and at its center in a sealed fashion between the plates 2 and 3. As best seen by referring to FIG. 2 the ring-shaped groove or channel arrangement 5 to 7 is arranged such that it forms between the inlet 4 and the outlet 9 a narrow, serpentine-shaped or undulated flow path for the liquid mixture along the membrane 1 at the upper surface or face thereof.

The collector plate 3 is provided at its periphery and at its center with sealing surfaces 15 and 16 as well as with an intermediately situated wide, ring-shaped recess or recess arrangement 17. This serves for the reception of a highly porous carrier element or supporting insert 18 which allows for the uniform support of the major portion of the underface or outlet surface 1b of the membrane 1 and at the same time an essentially unhindered, practically pressure loss-free withdrawal of the permeating substance (permeate) from the membrane 1, through the recess 17, via a collecting channel 19 radially arranged at the periphery of the plate 3, to a collector pipe or conduit 20. The ring-shaped carrier or supporting insert 19 can be constructed for this purpose in a number of different ways. It can, for instance, consist of a wire or grid network as well as of a perforated plate which, on the one hand, bears against the membrane 1 and, on the other hand, has a multiplicity of spacer elements for supporting the same against the floor of the recess 17. It is important that the insert 18 be able to uniformly support the entire membrane or diaphragm 1 against high pressure differences and at the same time be highly pervious both axially as well as radially. Basically, the insert 18 also could be constituted by highly porous frit, for instance glass frit.

The collector plate 3 is also provided with an axial bore 21 for the discharge of the retained material (retentate) from the separation module.

It should be understood that, if desired, there can be provided more than one throughflow opening 4 at the distributor plate 2 and more than one collecting channel 19 at the collector plate 3.

After the described separation module has been sealingly assembled together then it is ready for use. With the aid of a pump and appropriate conduits (not shown) the mixture to be separated can be conducted under pressure once or a number of times through the separation module in order to obtain the desired separation action, the permeate being withdrawn via the tube or conduit 20.

The described very simple arrangement of the separation module according to FIGS. 1 and 2 provides for the following significant practical advantages:

a. The membrane or diaphragm 1 is easily exchangeable and can be rapidly accommodated to the momentarily encountered separation work;

b. The membrane is effectively supported at both faces along its entire surface and sealingly arranged at the periphery and at the center, so that it can withstand, without deformation, high pressure differentials which occur during operation;

c. By virtue of the described relatively narrow ring-shaped groove arrangement 5, 6, 7 of the distributor plate 2 the entire mixture to be separated is guided under turbulent flow conditions along a very long serpentine-shaped path past the membrane surface, there thus being insured for optimum conditions with regard to a good separation action for high throughput at the inlet side of the membrane;

d. The highly porous supporting insert 18 provides for a maximum uniform supporting of the membrane 1 and nonetheless allows for the withdrawal of the permeate with insignificant pressure losses at the outlet or exit side of the membrane;

e. Owing to the advantages (a) to (d) explained above the separation module can be operated with different types of separation membranes both under high pressure as well as also under high vacuum, i.e. can be employed for perstraction as well as for pervaporation. The highly porous carrier element or support insert 18 allows for a uniform application of the vacuum at the entire outlet or exit surface of the membrane.

Hence, there is provided a simple, versatile separation module which can be employed for the most different separation work. It is only necessary to properly select the separation membrane and the operating conditions (pressure or vacuum) in order to insure for optimum separation conditions in all respects. This module can be advantageously employed for the separation of relatively small quantities of mixtures or also for the emperical determination of the optimum separation membranes and and separation conditions respectively. Also exactly the same advantages as discussed above are realized in larger separation apparatuses with a number of series or tandem arranged similar modules of the described type, the module components can be easily standardized and optionally accommodated to one another.

FIG. 3 shows in cross-sectional view a second exemplary embodiment of the invention with a number of separation modules connected behind one another or in tandem between end plates 22a and 22b. As best seen by referring to such Figure the membranes 1 at both ends of such modular arrangement are provided with a respective distributor plate 2 of exactly the same construction as shown in FIGS. 1 and 2 and described above. Intermediate thereof there are provided a number of simililar separation modules T, only one of which has been conveniently shown in FIG. 3. Each module T consists of two double distributor plates 2' constructed at both faces in the manner shown in FIGS. 1 and 2, two membranes 1 each with an axial opening 12 and an intermediately situated collector plate 3' which likewise is constructed at both faces in the manner shown in FIG. 1.

In this manner is is possible to easily stack a large number of such separation modules T on top of one another i.e. to arrange such behind one another in order to obtain the desired separation action. This simple arrangement allows for the rapid exchange of the separation membranes depending upon requirements.

As also shown schematically in FIG. 3 the described apparatus can be arranged together with a container 23 for the mixture in a closed circulation system equipped with a pump 24 in order to allow for a multiple pass of the mixture to be separated until the desired degree of separation has been obtained. The collector tubes or pipes 20 of the separation modules are connected via a common collector conduit or line 25 with a permeate container 26.

If the equipment according to FIG. 3 is employed for hyperfiltration or perstraction, then the pump 24 consists of a high-pressure pump and the membrane 1 of microporous permselective membranes of conventional structure, for instance formed of cellulose acetate or polyvinylchloride, the properties of which are accommodated in each instance to the components which are to be separated out.

On the other hand, in the case of pervaporation the pump 24 only serves as the circulation pump which merely delivers a sufficient pressure for overcoming the pressure losses during the flow of the substance through the separation modules. The collector tubes 20 and the collector conduit 25 in this instance are coupled in conventional manner with a not particularly illustrated vacuum pump as well as a cold trap.

The membranes 1 then consist of non-porous permselective membranes of diaphragms of similar conventional substances.

The different modular components of the described apparatuses must be resistant to the effects of the liquid mixtures, wherein, for instance, there can be employed to advantage steel, TEFLON, glass and so forth as the material for the distributor and/or collector plates.

Furthermore, it is here mentioned that when using substances with sufficient mechanical strength, for instance steel, for the distributor plates and the collector plates, the end plates 22a, 22b of the arrangement according to FIG. 3 can be omitted. Further, if desired there also can be only employed double-face acting distributor- and/or collector plates 2' and 3' respectively, formed of steel, while omitting both the corresponding single-face acting plates 2 and 3 respectively as well as the end plates 22a and 22b. In this way there can be obtained a separation arrangement which only is composed of the same type modules T according to FIG. 3. Consequently, the series or mass production can be simplified in that only two plate types are required for the assembly of the separation apparatus with random number of modules.

Module separation apparatuses of the described type can be used, for instance, to advantage for the separation of expensive substance mixtures which are present in relatively small quantities, and which cannot or only with great difficulty can be separated by conventional heretofore known separation techniques. Such separation problems occur, for instance, quite often in the perfume industry, where oftentimes one is dealing with heat sensitive substances which are difficult to separate.

Owing to the aspects of the invention it is possible to advantageously separate, for instance, azeotropic mixtures as well as turpentine-containing natural extracts or heat-sensitive physiologically effective substance mixtures.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for the separation of liquid mixtures by means of permselective separation membranes, comprising at least one separation module composed of a distributor plate, a collector plate and an intermediate situated separation membrane, said separation membrane having oppositely situated faces, one of said faces defining an effective membrane surface, the distributor plate being provided at the region of the effective membrane surface with at least one throughpassage opening arranged at the periphery thereof for the mixture to be separated and at least one open flow channel extending from said throughpassage opening towards the center of the membrane, said flow channel being arranged such that the mixture along one face of the membrane is subjected to a turbulent flow for the successive flushing of the membrane surface, said membrane being provided with an axial throughflow opening into which opens said flow channel, the collector plate comprising a body of imporous material formed with an axial bore, a substantially ring-shaped recess arranged opposite the flow channel, and at least one collecting channel leading from the ring-shaped recess towards the outside, and the collector plate also comprising a highly porous carrier element arranged in the ring-shaped recess for substantially uniformly supporting the membrane at a discharge side thereof defined by the other face, the carrier element being pressure resistant and highly porous to an extent sufficient to allow for a rapid unhindered flow-off of the permeate which flows through and out of the membrane via the ring-shaped recess to the collecting channel without any appreciable pressure drop and at the same time opposing any bending-through of the membrane, and sealing means provided at the distributor plate and the collector plate for sealing the flow channel and the ring-shaped recess at the center and at the periphery of the membrane from one another and from the surroundings against high pressure and vacuum.

2. The apparatus as defined in claim 1, wherein the flow channel comprises a number of concentric flow communicating ring-shaped grooves and a central recess.

3. The apparatus as defined in claim 1, wherein the carrier element comprises a wire grid network.

4. The apparatus as defined in claim 1, wherein the carrier element comprises a perforated plate bearing against the membrane and extending at a distance from the floor of the ring-shaped recess of the distributor plate.

5. The apparatus as defined in claim 4, wherein the perforated plate is supported by means of a multiplicity of spacers at the floor of the ring-shaped recess.

6. The apparatus as defined in claim 1, wherein the distributor plate is identically constructed at both faces thereof.

7. The apparatus as defined in claim 1, wherein the collector plate is identically constructed at both faces thereof.

8. The apparatus as defined in claim 1, wherein there are provided a plurality of such separation modules which are arranged in tandem, and wherein the distributor plates, with the exception of end plates, and the collector plates in each case are associated with two separation membranes.

9. The apparatus as defined in claim 1, wherein the distributor plate and the collector plate are formed of glass.

10. The apparatus as defined in claim 1, wherein the carrier element consists of frit.

11. The apparatus as defined in claim 10, wherein the frit comprises glass frit.

12. The apparatus as defined in claim 1, wherein the membrane is sealingly supported at both faces and towards the outside.

* * * * *